(12) United States Patent
Shinohara

(10) Patent No.: US 8,591,060 B2
(45) Date of Patent: Nov. 26, 2013

(54) LIGHT EMITTING DEVICE AND BULB-TYPE LED LAMP

(75) Inventor: Yoshinori Shinohara, Nagano (JP)

(73) Assignees: Nittoh Kogaku K.K. (JP); Yasuhiro Koike (JP)

( * ) Notice: Subject to any disclaimer, the term of this patent is extended or adjusted under 35 U.S.C. 154(b) by 95 days.

(21) Appl. No.: 13/260,583

(22) PCT Filed: Mar. 17, 2010

(86) PCT No.: PCT/JP2010/001918
§ 371 (c)(1),
(2), (4) Date: Sep. 27, 2011

(87) PCT Pub. No.: WO2010/119618
PCT Pub. Date: Oct. 21, 2010

(65) Prior Publication Data
US 2012/0020082 A1 Jan. 26, 2012

(30) Foreign Application Priority Data
Apr. 13, 2009 (JP) .................................. 2009-097103

(51) Int. Cl.
*F21V 3/00* (2006.01)
(52) U.S. Cl.
USPC ....... 362/235; 362/646; 362/640; 362/249.02
(58) Field of Classification Search
USPC ..................... 362/640, 646, 800, 235, 249.02
See application file for complete search history.

(56) References Cited

U.S. PATENT DOCUMENTS

| | | | | |
|---|---|---|---|---|
| 2,170,600 | A | * 8/1939 | Voll | ............................ 362/223 |
| 2008/0158875 | A1 | 7/2008 | Kim et al. | |

FOREIGN PATENT DOCUMENTS

| CN | 101211064 A | 7/2008 |
|---|---|---|
| JP | 10-82915 A | 3/1998 |
| JP | 2001-250986 A | 9/2001 |
| JP | 2002-245819 A | 8/2002 |
| JP | 2003-151306 A | 5/2003 |
| JP | 2008-91140 A | 4/2008 |
| JP | 2008-166250 A | 7/2008 |
| JP | 2009-43628 A | 2/2009 |
| KR | 10-2008-0062086 | 7/2008 |
| WO | 2009/020214 A1 | 2/2009 |

OTHER PUBLICATIONS

International Search Report for International Application No. PCT/JP2010/001918 mailed Jun. 22, 2010 with English translation.

* cited by examiner

*Primary Examiner* — Anabel Ton
(74) *Attorney, Agent, or Firm* — Cantor Colburn LLP

(57) ABSTRACT

Provided is a light emitting device which can uniformly diffuse and radiate light from all the regions of the globe of an LED bulb without deteriorating light transmission efficiency. A light emitting device is provided with a light scattering/guiding globe and an LED which is disposed on one end of the light scattering/guiding globe. The light scattering/guiding globe is a body with no air released from the inside and is composed of a light scattering/guiding material having light scattering particles contained therein. The globe has the bottom surface on the side of the LED, and is provided with a first light incoming surface as a first hollow section, which is formed in a circular cone shape in the light outputting direction from the bottom surface.

9 Claims, 15 Drawing Sheets

LIGHT EMITTING DEVICE AND BULB-TYPE LED LAMP

CROSS-REFERENCE TO RELATED APPLICATION

The present application is a national phase of an International application No. PCT/JP2010/001918 filed on Mar. 17, 2010, which relates to and claims priority from Japanese patent application No. 2009-097103 filed on Apr. 13. The contents of the International application and the Japanese application are incorporated herein by reference.

BACKGROUND OF THE INVENTION

1. Field of the Invention

The present invention relates to a light emitting device and a bulb-type LED lamp.

2. Description of Related Art

A traditional filament bulb has a diffusion film formed on a glass bulb (a globe) for controlling the glare in order to prevent a high intensity of a point light source from causing a discomfort feeling on humans. In the meantime, a bulb-type fluorescent light has a light emitting property that an entire lamp emits fluorescent light, and therefore glaring can easily be controlled.

On the other hand, taking advantage of high-power output and high-efficiency technologies of light emitting diodes (LEDs), light bulbs that uses an LED as a light source are put into practical use in recent years. Meanwhile, an LED has a small-sized light source, and its brightness is extremely high, and furthermore it has a light emitting property that it radially emits light in certain directions. Therefore, when being used as a light source of a light bulb, it is difficult for an LED to diffuse light uniformly all over a globe.

To solve the difficulty described above, proposed in Patent Document 1 is an LED light bulb equipped with a diffusion sheet placed on an external surface of a translucent globe, the LED light bulb being able to nearly homogenize its brightness.

Patent Document 1: JP 2008-91140 A

SUMMARY OF THE INVENTION

Since the LED light bulb proposed in Patent Document 1 is equipped with a diffusion sheet placed on an external surface of a translucent globe, the diffusion sheet lowers a light transmission rate, and accordingly the LED light bulb has a disadvantage that an efficiency of light radiation becomes deteriorated. Furthermore, there exists another disadvantage that additional work of placing the diffusion sheet is required, and there is also an unfavorable possibility that the diffusion sheet is peeled sometimes.

Moreover, in the LED light bulb proposed in Patent Document 1, a plurality of LEDs are used. A reason for using the plurality of LEDs is that using a single LED makes it further impossible to diffuse light uniformly all over the globe. In the meantime, using the plurality of LEDs makes it difficult to achieve a reduction in power consumption.

The present invention has been achieved under the circumstance described above, and it is an object of the present invention to provide a light emitting device and a bulb-type LED lamp that enable uniform light diffusion and radiation over an entire area of a globe of an LED light bulb as well as reduction of the number of LEDs to be used, without lowering a light transmission rate.

A first aspect of the present invention relates to a light emitting device. Namely, a light emitting device according to the present invention comprises: a globe; and an LED which is disposed on one end of the globe; in which: the globe is a solid component made of a light scattering/guiding member containing light scattering particles, and the globe has a bottom plane facing the LED, and provided with a first hollow section, which is formed in a conical shape in the light outputting direction from the bottom plane.

The light emitting device may further comprise a second hollow section shaped around the first hollow section portion, in which the second hollow section has a concave shape in which a position located further away from the LED toward an outer circumference side has a deeper depth.

Alternatively, the light emitting device may further comprise a second hollow section between the bottom plane of the conical shape of the first hollow section and the LED, in which the second hollow section has a circular shape larger than the bottom plane, and has a concave shape in which a position located further away from the LED toward an outer circumference of the circular shape has a shallower depth.

The globe may be at least partially shaped like a ball. Alternatively, the globe may be at least partially shaped like a circular cylinder, and one end of the circular cylinder opposite from the LED, may be shaped like a convex lens.

The light emitting device may comprise a plurality of LEDs, the emission colors of which are different from each other, disposed on the one end of the globe; and a dimming controller for controlling light emission intensity individually of the plurality of LEDs.

A second aspect of the present invention relates to a bulb-type LED lamp. Namely, a bulb-type LED lamp according to the present invention comprises the light emitting device according to the present invention.

According to the present invention, it becomes possible to diffuse and radiate light uniformly over an entire area of a globe of an LED light bulb, and to reduce the number of LEDs to be used, without lowering a light transmission rate.

BRIEF DESCRIPTION OF THE DRAWINGS

FIG. 2 shows traveling paths of rays of light emitted from an LED placed in a light scattering/guiding globe shown in FIG. 1, wherein FIG. 2 shows relationships between the traveling paths of the rays of light and a first light incoming surface.

FIG. 3 shows traveling paths of rays of light emitted from the LED placed in the light scattering/guiding globe shown in FIG. 1, wherein FIG. 3 shows relationships between the traveling paths of the rays of light and a second light incoming surface.

FIG. 13 shows traveling paths of rays of light emitted from an LED placed in a light scattering/guiding globe shown in FIG. 12, wherein FIG. 13 shows relationships between the traveling paths of the rays of light and a first light incoming surface.

FIG. 14 shows traveling paths of rays of light emitted from the LED placed in the light scattering/guiding globe shown in FIG. 12, wherein FIG. 14 shows relationships between the traveling paths of the rays of light and a second light incoming surface.

Figure 1:
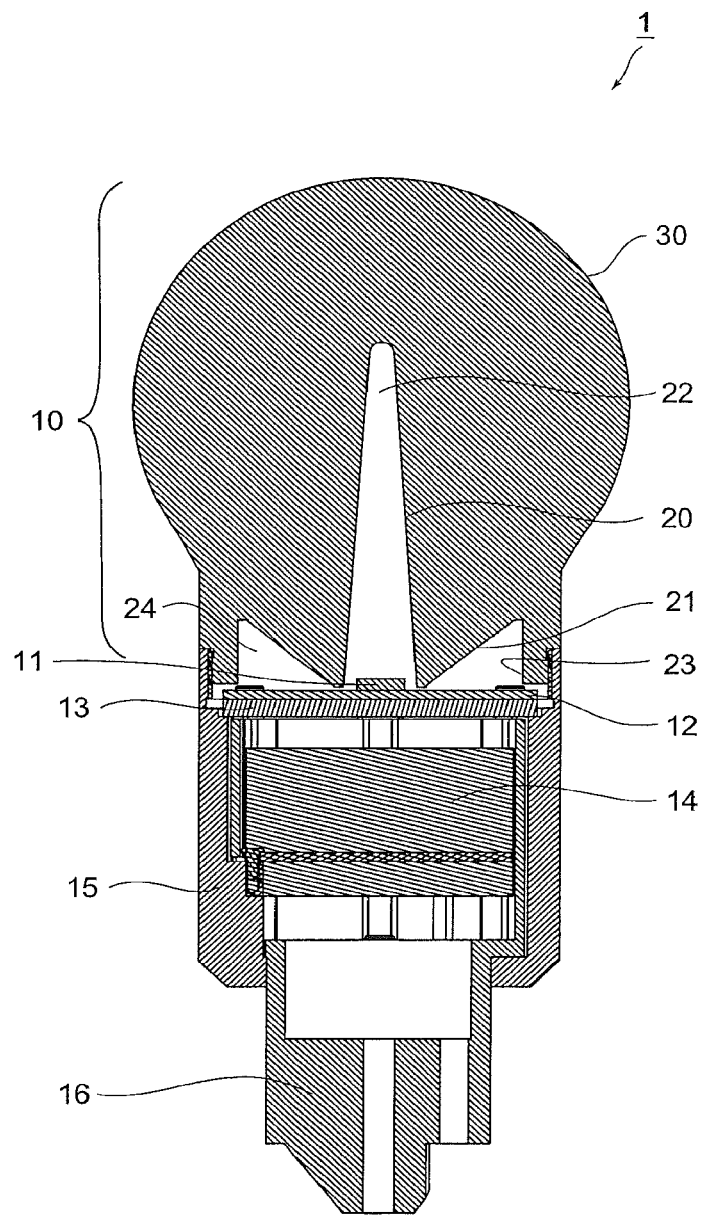
FIG. 1 is a general configuration drawing of a bulb-type LED lamp according to a first embodiment of the present invention.

DETAILED DESCRIPTION OF THE PREFERRED EMBODIMENTS (Regarding a Bulb-Type LED Lamp 1 According to a First Embodiment of the Present Invention)

Explained below is a structure of a bulb-type LED lamp 1 according to a first embodiment of the present invention. A light emitting device is explained together with the explanation on the bulb-type LED lamp 1. The bulb-type LED lamp 1 principally comprises a light scattering/guiding globe 10 that contains light scattering particles, an LED 11, a circuit board 12, a heat dissipating plate 13, a power supply section 14, a heat dissipating cover 15, and a lamp base 16.

The light scattering/guiding globe 10 is shaped like a bulb globe with a light scattering/guiding material. Being different from a conventional bulb globe, the light scattering/guiding globe 10 is a solid component whose internal part is made solid. The light scattering/guiding globe 10 is a resin molded body, for example, made of transparent poly-methyl methacrylate (hereinafter abbreviated to "PMMA"). In the PMMA to be used for shaping the light scattering/guiding globe 10, dispersed are translucent silicone particles with their particle diameter of 1 to 10 micron meters, as light scattering particles. Thus, the light scattering/guiding globe 10 works as a light dispersing component.

The LED 11 is, for example, a white LED. The circuit board 12 comprises a circuit pattern for illuminating the LED 11, and it is also equipped with required elements (such as a resistor, a constant voltage diode, and so on which are not shown). The heat dissipating plate 13 is made of, for example, a metal plate for absorbing the heat of the LED 11. The power supply section 14 is equipped with a power supply circuit for supplying the LED 11 with a constant current. In other words, the power supply section 14 converts an AC current (100V) into a DC current to generate a voltage value and a constant current value that meet rated specification values for the LED 11.

In the meantime, the heat dissipating cover 15 is connected to the heat dissipating plate 13 in order to externally dissipate the heat absorbed by the heat dissipating plate 13. The lamp base 16 is prepared according to the same standards as for a lamp base of a traditional filament bulb so that the bulb-type LED lamp 1 can be installed to a device to which a traditional filament bulb has been installed up to that time.

A section positioned higher than the circuit board 12 in FIG. 1 corresponds to a light emitting device that is claimed. Alternatively, one or more of the circuit board 12, the heat dissipating plate 13, the power supply section 14, and the heat dissipating cover 15 may be comprised in the light emitting device.

The light scattering/guiding globe 10 is further explained in detail. As described above, the light scattering/guiding globe 10 is shaped with a light scattering/guiding material. The light scattering/guiding globe 10 comprises a first light incoming surface 20 and a second light incoming surface 21, through both of which light from the LED 11 enters the light scattering/guiding globe 10. The light scattering/guiding globe 10 further comprises a first hollow section 22 so surrounded by the first light incoming surface 20 as to be conical, a second hollow section 24 so surrounded by the second light incoming surface 21, a columnar surface 23, and the circuit board 12 as to be shaped surrounding the first hollow section 22. The light scattering/guiding globe 10 still further comprises a radiation surface 30 for externally outputting light from an internal section of the light scattering/guiding globe 10.

Figure 2:
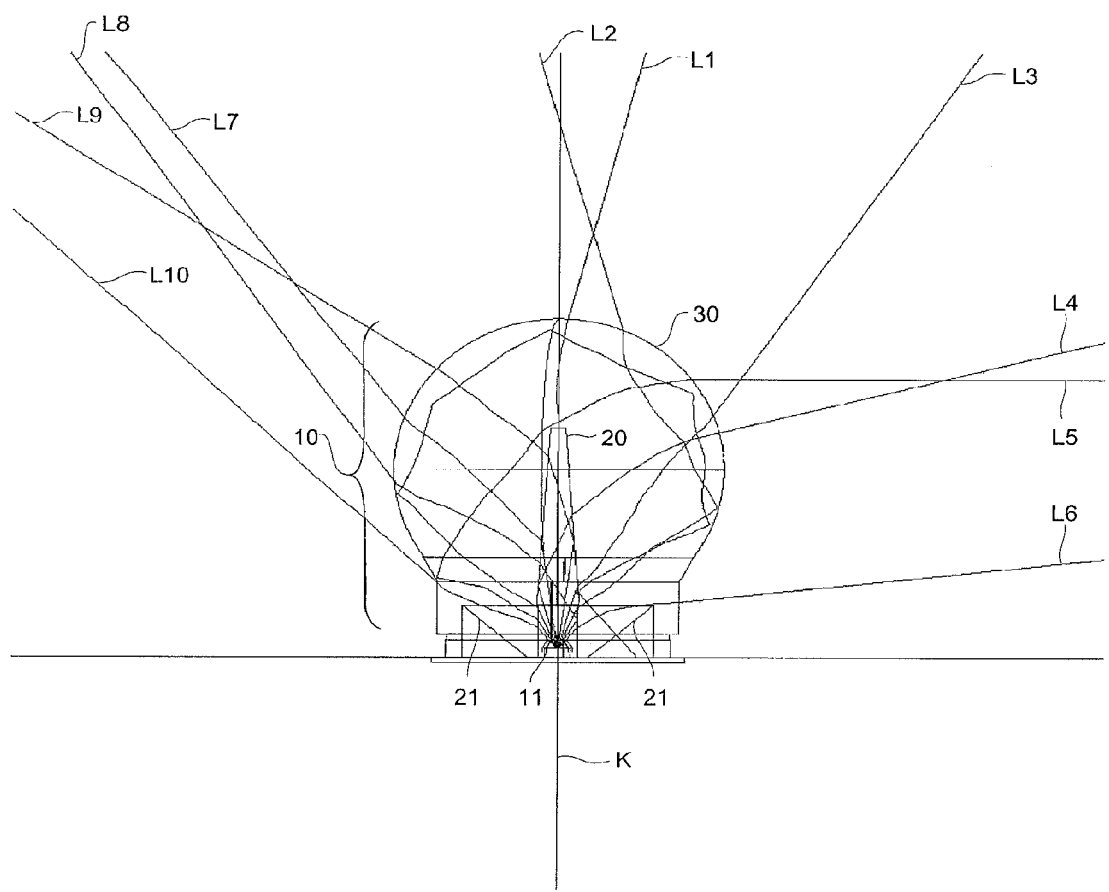
Figure 3:
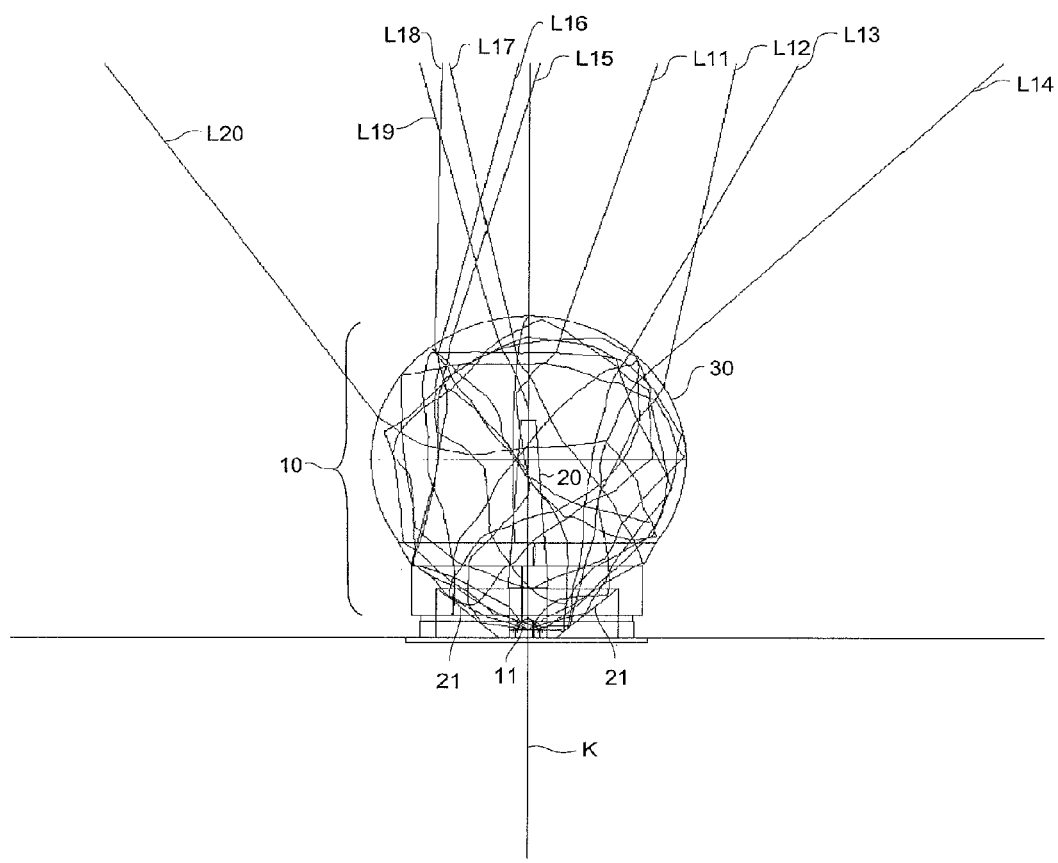

FIG. 2 and FIG. 3 show traveling paths of rays of light emitted from the LED 11 placed in the light scattering/guiding globe 10. As shown in FIG. 2, relationships between the LED 11 and the first light incoming surface 20 are set in such a way that, among rays of light emitted from the LED 11, those emitted at a small angle (0 to 45 degrees) in relation to an optical-axis normal line "K" enter the light scattering/guiding globe 10 through the first light incoming surface 20.

The first light incoming surface 20 is shaped by deeply hollowing out a central inside surface of the light scattering/guiding globe 10, which is almost spherical, so as to make the surface part conical. The rays of light emitted at a small angle (0 to 45 degrees) in relation to the optical-axis normal line "K" are refracted by the first light incoming surface 20 so that the rays of light enter the light scattering/guiding globe 10 at an entrance angle in relation to the optical-axis normal line "K", which is greater than the emission angle.

When colliding with a scattering fine particle as a light scattering particle, each ray of light that has entered the light scattering/guiding globe 10 is scattered in all directions while having a large directivity angle toward a front side in a traveling direction. Repeating such a scatter operation multiple times (which is called "multiple-scattering"), the ray of light travels forward in the light scattering/guiding globe 10. At the time of such a scatter operation, no light absorption happens. Meanwhile, there are remarkably few rays of light that return backward due to the scatter operation, and therefore most rays of light can be output from the radiation surface 30.

The first light incoming surface 20 plays a role of significantly changing directions of incoming rays of light from the LED 11. Then, adjusting incident angles of rays of light makes it possible to output the rays of light evenly from an entire section of the radiation surface 30 of the light scattering/guiding globe 10.

Explained next with reference to FIG. 2 are rays of light that enter from the first light incoming surface 20, pass through the light scattering/guiding member, and are output from the radiation surface 30 as outgoing rays of light L1 to L10. Incidentally, an upper side/a lower side/a right side/a left side in the following explanation correspond to an upper side/a lower side/a right side/a left side in the drawing, respectively.

The outgoing ray of light L1 is radiated almost in a direction of the optical-axis normal line "K" of the LED 11 so as to enter the light scattering/guiding globe 10 almost along a center line of the first hollow section 22 of the first light incoming surface 20. Therefore, almost without being refracted at the first light incoming surface 20, the outgoing ray of light L1 enters the light scattering/guiding globe 10. Then, being multiple-scattered and refracted somewhat in the light scattering/guiding globe 10, the outgoing ray of light L1 is output in an upper right direction from a position in the vicinity of a top of the light scattering/guiding globe 10.

The outgoing ray of light L2 is radiated in a direction tilted to the right side for about 20 degrees from the optical-axis normal line "K" of the LED 11 so as to enter the light scattering/guiding globe 10 while being refracted to the right side by the first light incoming surface 20. Then, being multiple-scattered in the light scattering/guiding globe 10, the incoming ray of light collides with the radiation surface 30. At the time, the incident angle with respect to the radiation surface 30 is greater than a critical angle that brings about a total reflection, and therefore the ray of light is totally reflected. Then, the outgoing ray of light L2, which has been totally reflected in an upper left direction by the radiation surface 30 of the light scattering/guiding globe 10, collides with a right-hand position of the radiation surface 30, which is in the vicinity of the top of the light scattering/guiding globe 10. At the time, the incident angle is smaller than the critical angle, and therefore the ray of light is output in an upper left direction from the radiation surface 30.

The outgoing ray of light L3 is radiated in a direction tilted to the right side for about 15 degrees from the optical-axis normal line "K" of the LED 11 so as to enter the light scattering/guiding globe 10 while being refracted somewhat to the right side by the first light incoming surface 20, and then the ray of light is multiple-scattered therethrough. Subsequently, almost without any further refraction, the ray of light is output in an upper right direction from a right position of the radiation surface 30 of the light scattering/guiding globe 10.

The outgoing ray of light L4 reaches a left position of the first light incoming surface 20 at an incident angle greater than that of the outgoing ray of light L3 so that the ray of light is totally reflected by the first light incoming surface 20. Then, at a position of the first light incoming surface 20, which is opposite to the left position mentioned above, the ray of light enters the light scattering/guiding globe 10 while being refracted somewhat to the right side, and it is multiple-scattered therethrough. While being multiple-scattered in the light scattering/guiding globe 10, the outgoing ray of light L4 is refracted to the right side, and output in an upper right direction from a right position of the radiation surface 30 of the light scattering/guiding globe 10.

The outgoing ray of light L5 is radiated toward the left side from the LED 11, and the ray of light enters the light scattering/guiding globe 10 while being refracted somewhat to the left side by the first light incoming surface 20. Subsequently, being multiple-scattered in the light scattering/guiding globe 10, the outgoing ray of light L5 reaches the radiation surface 30. The outgoing ray of light L5 is totally reflected in an upper right direction by the radiation surface 30. Then, while being multiple-scattered in the light scattering/guiding globe 10, the ray of light is refracted toward the right side, and it is output horizontally in a right direction from a right position of the radiation surface 30 of the light scattering/guiding globe 10.

The outgoing ray of light L6 is radiated from the LED 11 in a direction tilted to the right side for about 30 degrees from the optical-axis normal line "K"; and as being refracted somewhat to the right side by the first light incoming surface 20, the ray of light enters the light scattering/guiding globe 10. Then, while being multiple-scattered in the light scattering/guiding globe 10, the outgoing ray of light L6 is further refracted to the right side, and output in a somewhat upper right direction from a bottom position at the right side of the radiation surface 30 of the light scattering/guiding globe 10.

The outgoing ray of light L7 is radiated from the LED 11 in a direction tilted to the left side for about 8 degrees from the optical-axis normal line "K", and it enters the light scattering/guiding globe 10, as being remarkably refracted to the left side by the first light incoming surface 20. The LED 11 is not a point source of light, and therefore being different from the outgoing ray of light L4 that is totally reflected, the outgoing ray of light L7 is not totally refracted. Namely, there exist some rays of light that enters the light scattering/guiding globe 10 without total reflection. Then, while being multiple-scattered in the light scattering/guiding globe 10, the outgoing ray of light L7 is refracted somewhat to the left side, and output in an upper left direction from an upper position at the left side of the radiation surface 30 of the light scattering/guiding globe 10.

The outgoing ray of light L8 is radiated from the LED 11 in a direction tilted to the right side for about 35 degrees from the optical-axis normal line "K", and it enters the light scattering/guiding globe 10, as being totally reflected to the left side by the first light incoming surface 20. Then, while being multiple-scattered in the light scattering/guiding globe 10, the outgoing ray of light L8 is refracted somewhat to the lower side, and output in an upper left direction from a left position of the radiation surface 30 of the light scattering/guiding globe 10.

The outgoing ray of light L9 is radiated from the LED 11 in a direction tilted to the right side for about 8 degrees from the optical-axis normal line "K", and then totally reflected to the left by the first light incoming surface 20. Then, at a position of the first light incoming surface 20, which is opposite to the totally-reflecting position mentioned above, the outgoing ray of light L9 enters the light scattering/guiding globe 10 while being refracted to the left. Subsequently, while being multiple-scattered in the light scattering/guiding globe 10, the outgoing ray of light L9 is output in an upper left direction from an upper position at the left side of the radiation surface 30 of the light scattering/guiding globe 10.

The outgoing ray of light L10 is radiated from the LED 11 in a direction tilted to the left side for about 35 degrees from the optical-axis normal line "K", and it enters the light scattering/guiding globe 10, as being refracted somewhat to the left side by the first light incoming surface 20. Then, while being multiple-scattered in the light scattering/guiding globe 10, the outgoing ray of light L10 is output in an upper left direction from a lower position at the left side of the radiation surface 30 of the light scattering/guiding globe 10.

FIG. 3 shows outgoing rays of light L11 to L20 that enter the first light incoming surface 20 and move toward the second light incoming surface 21 through their traveling paths. The LED 11 and the second light incoming surface 21 are set in such a way that, among rays of light emitted from the LED 11, those emitted at a large angle (45 to 90 degrees) in relation to an optical-axis normal line "K" enter the light scattering/guiding globe 10 through the first light incoming surface 20, and subsequently they are totally reflected by the second light incoming surface 21 so as to return into the light scattering/guiding globe 10. The second light incoming surface 21 is placed as a top surface of the second hollow section 24 shaped around the first hollow section 22 that is surrounded by the first light incoming surface 20, and the second light incoming surface 21 is shaped with a circular form that is greater than a bottom plane of the first hollow section 22 being shaped conically. Then, the second hollow section 24 has a concave shape in which a position located further away from the LED 11 toward an outer circumference of the circular form has a deeper depth. In other words, the second light incoming surface 21 is shaped like a concave form of a concave lens so as to have a function like a kind of concave mirror.

A ray of light tilted at a large angle (45 to 90 degrees) in relation to an optical-axis normal line "K" enters the light scattering/guiding globe 10 through the first light incoming surface 20, and subsequently it is reflected by the second light incoming surface 21 so as to move upward in the light scattering/guiding globe 10 at a smaller traveling tilt angle in relation to an optical-axis normal line "K." As a result, an excessive output of light from around a root section of the radiation surface 30 of the light scattering/guiding globe 10 can be controlled so that rays of light are evenly radiated from all over the light scattering/guiding globe 10.

Next, the outgoing rays of light L11 to L20 are explained with reference to FIG. 3. Incidentally, an upper side/a lower side/a right side/a left side in the following explanation correspond to an upper side/a lower side/a right side/a left side in the drawing, respectively.

The outgoing ray of light L11 is radiated in a direction tilted to the left side for about 85 degrees (almost horizontally toward the left side) from the optical-axis normal line "K" of the LED 11 to pass through the first light incoming surface 20 and enter the light scattering/guiding globe 10. Subsequently, the outgoing ray of light L11 is totally reflected upward by a left side slope of the second light incoming surface 21 to move in such a way as to lift off through a spherical section of the light scattering/guiding globe 10. Then, while being multiple-scattered in the light scattering/guiding globe 10, the ray of light L11 is refracted to the right side, and output in an upper right direction from a right position in the vicinity of the top of the radiation surface 30 of the light scattering/guiding globe 10.

The outgoing rays of light L12, L13, and L14 are radiated in directions tilted to the right side for about 90 degrees (almost horizontally toward the right side) from the optical-axis normal line "K" of the LED 11 to enter the light scattering/guiding globe 10 almost without any refraction at the first light incoming surface 20. Subsequently, each of the rays of light L12, L13, and L14 travels while being multiple-scattered, and each of them is totally reflected upward by a right side slope of the second light incoming surface 21 to move in such a way as to lift off through the spherical section of the light scattering/guiding globe 10. Then, while being multiple-scattered in the spherical section of the light scattering/guiding globe 10, each of them is refracted to the right side, and output in an upper right direction from an upper position of the right side of the radiation surface 30 of the light scattering/guiding globe 10.

The outgoing rays of light L15, L16, and L18 are radiated in directions tilted to the left side for about 60 degrees from the optical-axis normal line "K" of the LED 11 to enter the light scattering/guiding globe 10, as being refracted somewhat to the left side by the first light incoming surface 20. Subsequently, each of the rays of light L15, L16, and L18 travels through the light scattering/guiding globe 10 while being multiple-scattered, and it is totally reflected upward by the second light incoming surface 21 to move in such a way as to lift off. Then, from an upper position of the left side of the radiation surface 30 in the spherical section of the light scattering/guiding globe 10, the outgoing rays of light L15 and L16 are output in upper right directions, and meanwhile the outgoing ray of light L18 is output in an upward direction.

The outgoing ray of light L17 is radiated in a direction tilted to the right side for about 60 degrees from the optical-axis normal line "K" of the LED 11 to enter the light scattering/guiding globe 10, as being refracted somewhat to the right side by the first light incoming surface 20. Then, the outgoing ray of light L17 travels, while being multiple-scattered in the light scattering/guiding globe 10, and it is totally reflected upward by the second light incoming surface 21 so as to be output in an upper left direction from an upper position of the left side of the radiation surface 30 of the light scattering/guiding globe 10.

Detailed explanations with regard to the outgoing rays of light L19 and L20 are omitted. Both the outgoing rays of light L19 and L20 are emitted from the LED 11 in directions largely tilted (within a range from 45 to 90 degrees) from the optical-axis normal line "K." Having passed through the first light incoming surface 20, both the rays of light are totally reflected by the second light incoming surface 21 so as to move in such a way as to lift off toward the spherical section of the light scattering/guiding globe 10. Being multiple-scattered in the light scattering/guiding globe 10 so as to change their traveling directions, both the rays of light are output from upper positions of the radiation surface 30 in the end.

Besides that, being just a little in comparison with the outgoing rays of light L1 to L20, observed are some rays of light that repeat total reflection and multiple-scattering within the light scattering/guiding globe 10 and eventually disappear in the end, without being output from the light scattering/guiding globe 10.

Figure 4:
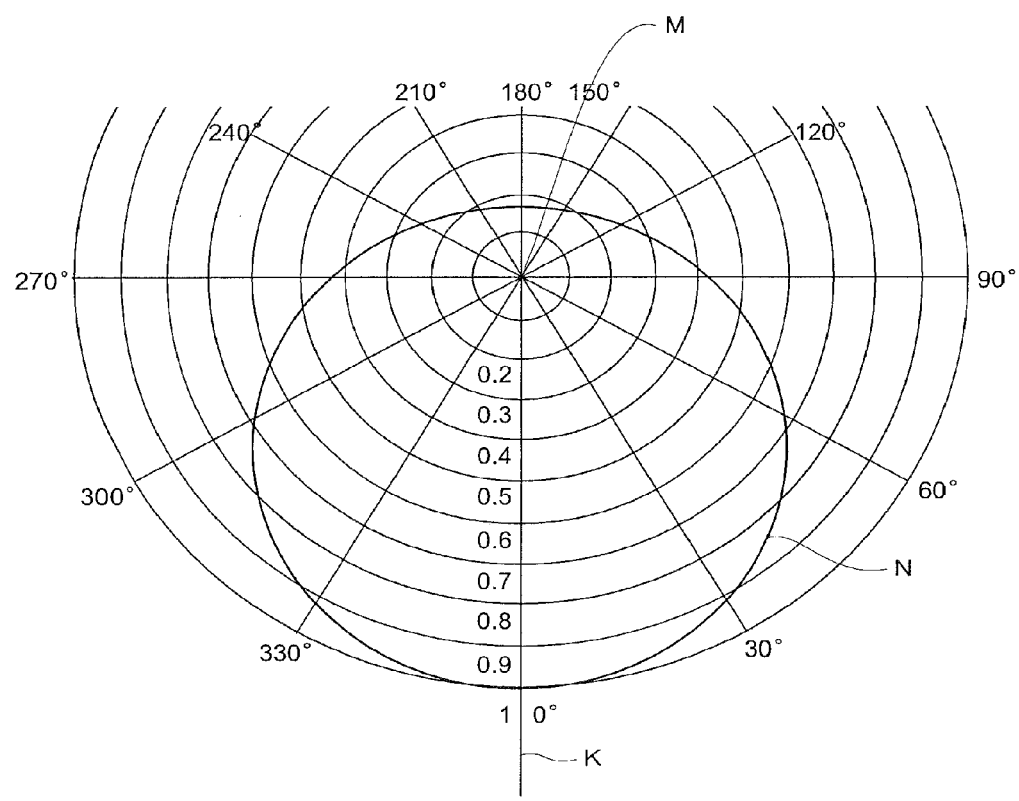
FIG. 4 shows a light intensity distribution of output light from a radiation surface of the bulb-type LED lamp shown in FIG. 1.

FIG. 4 shows a light intensity distribution of output light from the radiation surface 30 of the bulb-type LED lamp 1. The LED 11 is placed at an intersection point "M" of a line connecting a 90-degree orientation with a 270-degree orientation and the optical-axis normal line "K." An actual light intensity distribution is represented as a sphere made up by turning a distribution line "N" shown in FIG. 4 around the optical-axis normal line "K." As shown in FIG. 4, a highest light intensity is observed at a direction of the optical-axis normal line "K" of the LED 11. Furthermore, it is understood that an angular range of 90 degrees in total with its centerline at the direction of the optical-axis normal line "K" has almost the same output of light flux as the direction of the optical-axis normal line "K" has. On this occasion, a scale for a distance from the light source is provided with values of 0.1 to 1, and these values represent relative locations in view from the light source without any particular unit. The same way of explanation is also applied to FIG. 9, FIG. 14, and FIG. 19, which are described later. Moreover, as shown in FIG. 4, a certain amount of light is output in a rearward direction of the LED 11, and the light intensity distribution is similar to that of a filament bulb. Such a movement of light toward a rear side of the LED 11 has been achieved in the past with an extra member, such as a reflection plate, in a conventional LED lighting system.

Figure 5:
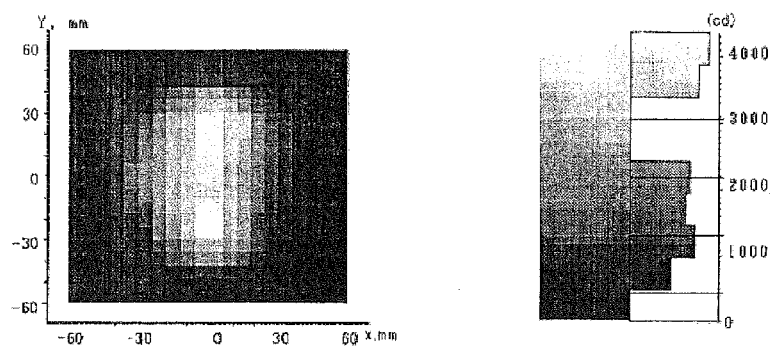
FIG. 5 shows a brightness of light emission from a side surface of the light scattering/guiding globe shown in FIG. 1.
Figure 6:
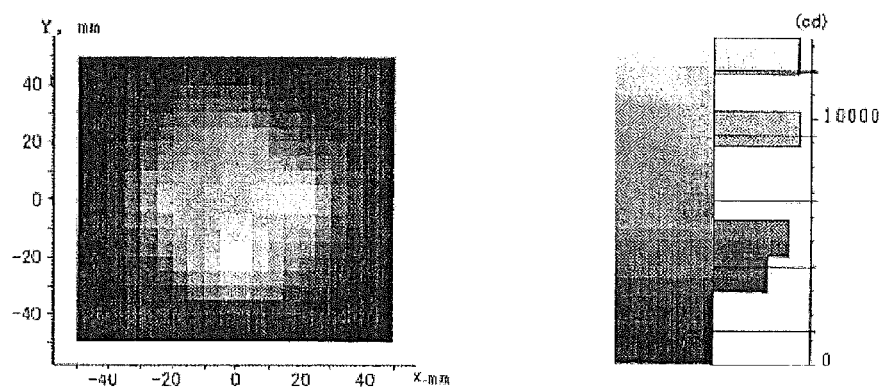
FIG. 6 shows a brightness of light emission from a top surface of the light scattering/guiding globe shown in FIG. 1.

FIG. 5 shows a brightness of light emission from a side surface of the light scattering/guiding globe 10. In the meantime, FIG. 6 shows a brightness of light emission from a top surface of the light scattering/guiding globe 10. For both FIG. 5 and FIG. 6, a brightness of the light scattering/guiding globe 10 is measured at a position 1 meter away from the light scattering/guiding globe 10. A right drawing of FIG. 5 represents the brightness distribution of a left drawing of FIG. 5 with numerical values. The right drawing of FIG. 5 shows the brightness distribution in candela (cd). In the meantime, a right drawing of FIG. 6 represents the brightness distribution of a left drawing of FIG. 6 with numerical values. The right drawing of FIG. 6 shows the brightness distribution in candela (cd).

According to FIG. 5 and FIG. 6, it is understood that light is output with almost even brightness both from the side surface as well as from the top surface of the light scattering/guiding globe 10. A maximum brightness in the right drawing of FIG. 5 is located at around 4500 (cd), and a maximum brightness in the right drawing of FIG. 6 exceeds 10,000 (cd). Thus, it is understood that the brightness of the light scattering/guiding globe 10 is higher at the top surface than at the side surface.

(Regarding a Bulb-Type LED Lamp 1A According to a Second Embodiment of the Present Invention)

Figure 7:
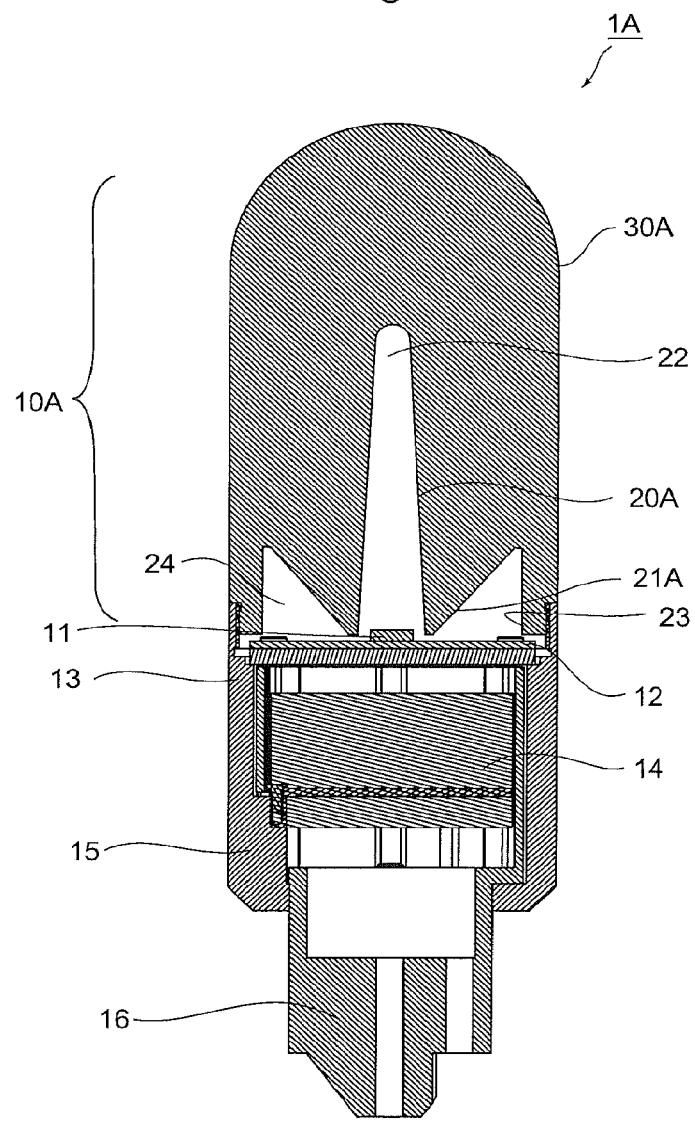
FIG. 7 is a general configuration drawing of a bulb-type LED lamp according to a second embodiment of the present invention.

Explained below is a bulb-type LED lamp 1A according to a second embodiment of the present invention. FIG. 7 is a configuration drawing of the bulb-type LED lamp 1A. The bulb-type LED lamp 1A is partially different from the bulb-type LED lamp 1. In the following explanation; any member, which is identical or equivalent to that in the first embodiment, is explained by using the same or similar reference numeral, and then the explanation is omitted or simplified; and on the other hand any member, which is specific to the second embodiment, is mainly explained.

In the bulb-type LED lamp 1A, a light scattering/guiding globe 10A has a circular cylindrical shape. In other words, at least a part of the light scattering/guiding globe 10A is shaped like a circular cylinder; and an end of the circular cylinder, which is opposite to a side of the LED 11, is shaped like a convex lens.

Thus, an outer profile of the light scattering/guiding globe 10A is circular-cylindrical, being long and thin, and therefore the bulb-type LED lamp 1A can be installed even in a dug ceiling hole equipped with a small reflector. Furthermore, even without any extra reflector, the bulb-type LED lamp 1A on its own can evenly radiate light over a wide area, and an objective radiation angle can be adjusted.

Figure 8:
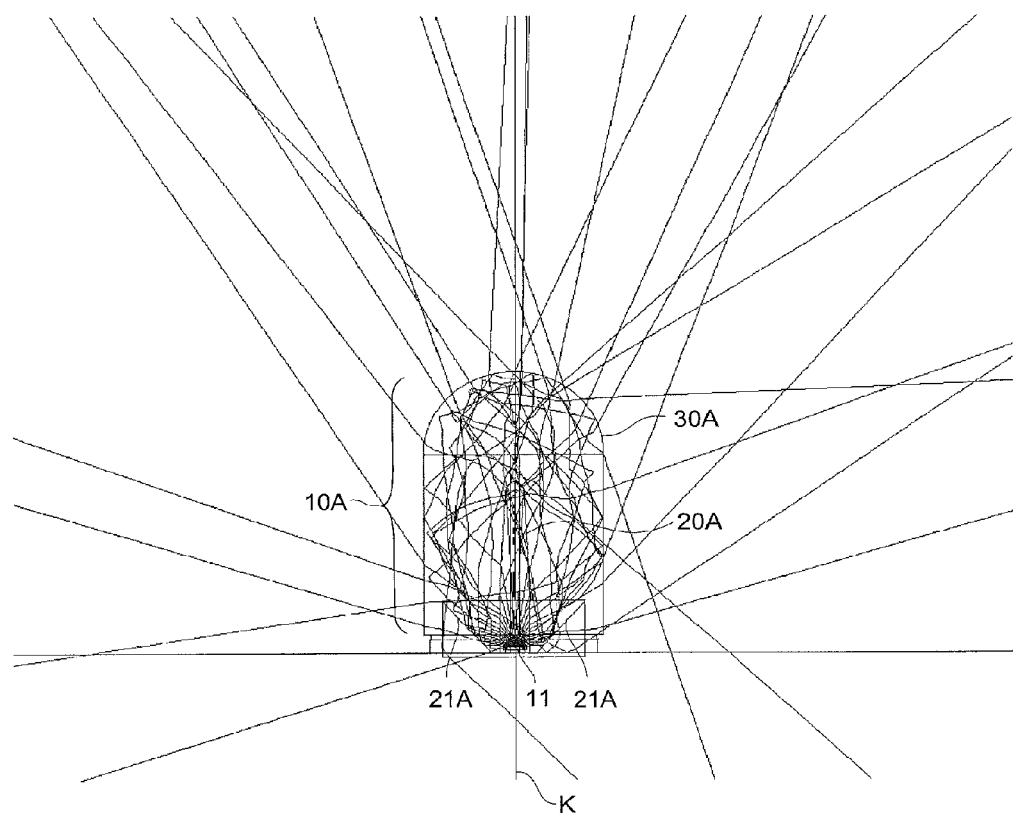
FIG. 8 shows traveling paths of rays of light emitted from an LED placed in a light scattering/guiding globe shown in FIG. 7.

FIG. 8 shows traveling paths of rays of light emitted from the LED 11. Rays of light, which come in through a first light incoming surface 20A and a second light incoming surface 21A, move forward while being multiple-scattered in the light scattering/guiding globe 10A. Then, they are output from a radiation surface 30A in a forward direction, a diagonally forward direction, a side direction, and a rearward direction.

Thus, it is understood that the rays of light radiated from the LED 11 are output in all directions through the light scattering/guiding globe 10A.

Figure 9:
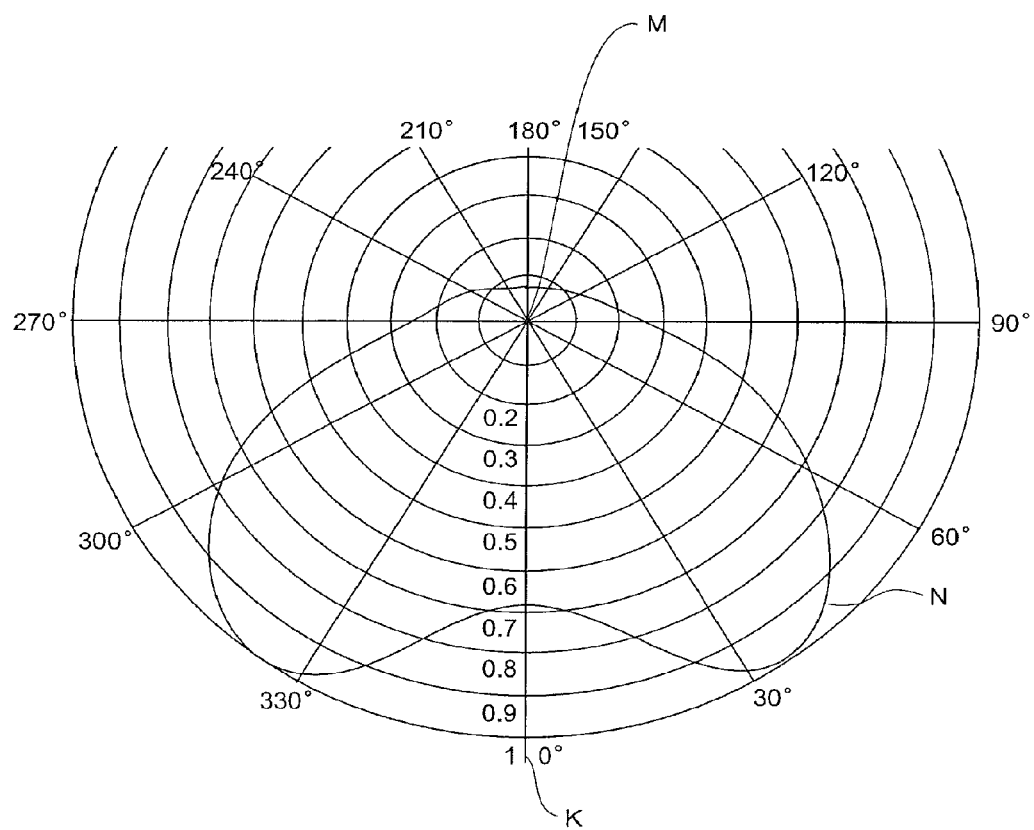
FIG. 9 shows a light intensity distribution of output light from a radiation surface of the bulb-type LED lamp shown in FIG. 7.

FIG. 9 is a drawing that corresponds to FIG. 4, and it shows a light intensity distribution of output light from the radiation surface 30A of the bulb-type LED lamp 1A. It is understood that there exists an almost constant output of light flux within a wide orientation range from 315 degrees to 45 degrees with respect to an optical-axis normal line of the LED 11. Moreover, light also travels in a rearward direction of the LED 11 as well in the same way as it does in the bulb-type LED lamp 1.

Figure 10:
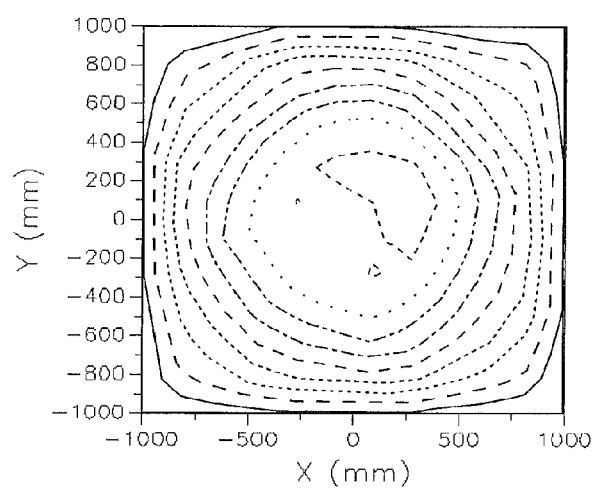
FIG. 10 shows a radiated light distribution at a position 1 meter ahead of the bulb-type LED lamp shown in FIG. 7.
Figure 11:
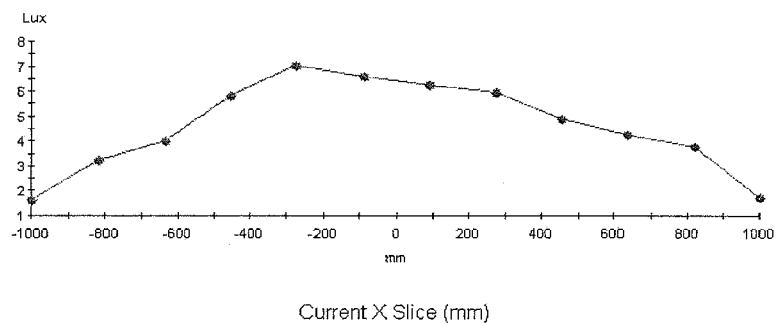
FIG. 11 shows a state of the radiated light distribution, shown in FIG. 10, in an area around a 0-mm position while a horizontal axis and a vertical axis representing a distance and a luminous intensity, respectively.

FIG. 10 shows a radiated light distribution at a position 1 meter ahead of the top (a part shaped like a lens) of the light scattering/guiding globe 10A, wherein a view field stretches for 1 meter each upward, downward, rightward, and leftward with its center at the position mentioned above. Meanwhile, FIG. 11 shows a state of the radiated light distribution, shown in FIG. 10, in an area around a 0-mm position while a horizontal axis and a vertical axis representing a distance and a luminous intensity (Unit: Lux), respectively. It is understood that, according to the bulb-type LED lamp 1A, light is radiated evenly over a wide range as shown in FIG. 10 and FIG. 11.

(Regarding a Bulb-Type LED Lamp 1B According to a Third Embodiment of the Present Invention)

Figure 12:
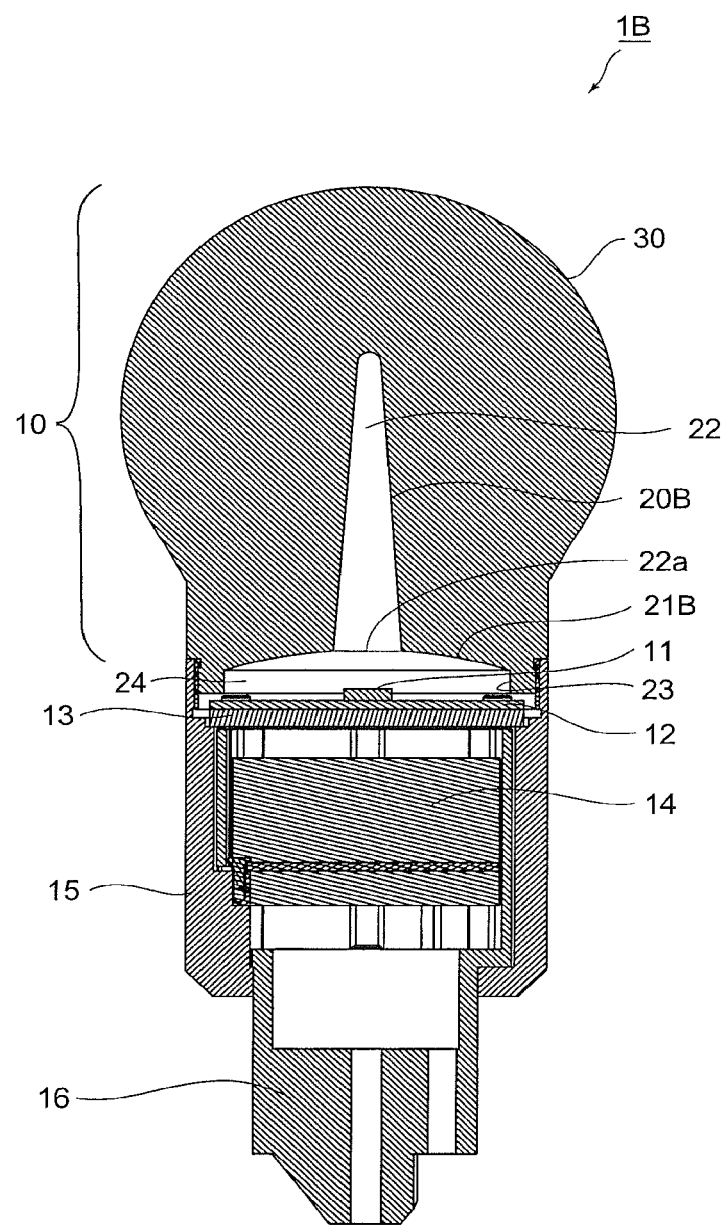
FIG. 12 is a general configuration drawing of a bulb-type LED lamp according to a third embodiment of the present invention.

Explained below is a bulb-type LED lamp 1B according to a third embodiment of the present invention. FIG. 12 is a configuration drawing of the bulb-type LED lamp 1B. The bulb-type LED lamp 1B is partially different from the bulb-type LED lamp 1. In the following explanation; any member, which is identical or equivalent to that in the first embodiment, is explained by using the same or similar reference numeral, and then the explanation is omitted or simplified; and on the other hand any member, which is specific to the third embodiment, is mainly explained.

In the bulb-type LED lamp 1B, a second light incoming surface 21B is different from the second light incoming surface 21 of the bulb-type LED lamp 1. Namely, between a bottom plane 22a of the first hollow section 22, being shaped conically, surrounded by the first light incoming surface 20B and the LED 11, the second light incoming surface 21B has a circular shape larger than the bottom plane 22a of the conical hollow section. The second light incoming surface 21B has a concave shape in which a position located further away from the LED 11 toward an outer circumference of the circular shape has a shallower depth, in other words, a distance between the second light incoming surface 21B and the heat dissipating plate 13 at the position becomes shorter. In the present example case, being combined together, the first hollow section 22 and the second hollow section 24 are shaped both-in-one.

Figure 13:
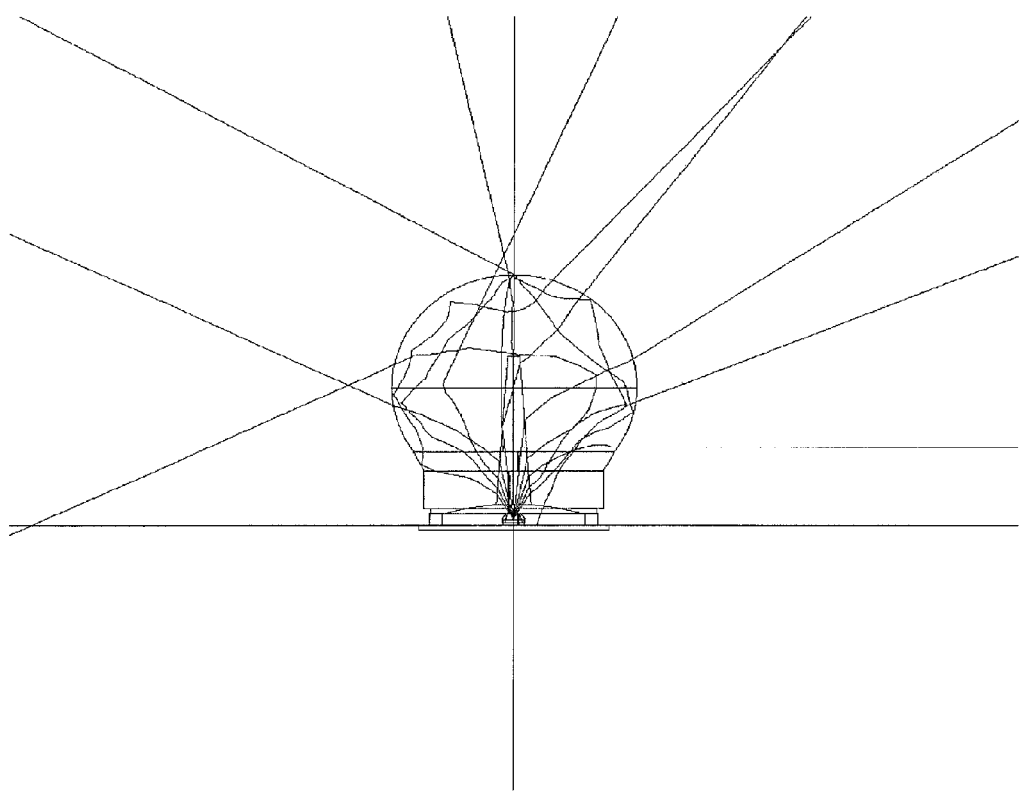

FIG. 13 shows traveling paths of light that has entered the first light incoming surface 20B. As shown in FIG. 13, the light having collided with the first light incoming surface 20B travels into the light scattering/guiding globe 10 and moves toward the radiation surface 30 while being multiple-scattered. Then, most of the light is output in a frontward direction of the bulb-type LED lamp 1B, while some of the light moves in sideward and rearward directions.

Figure 14:
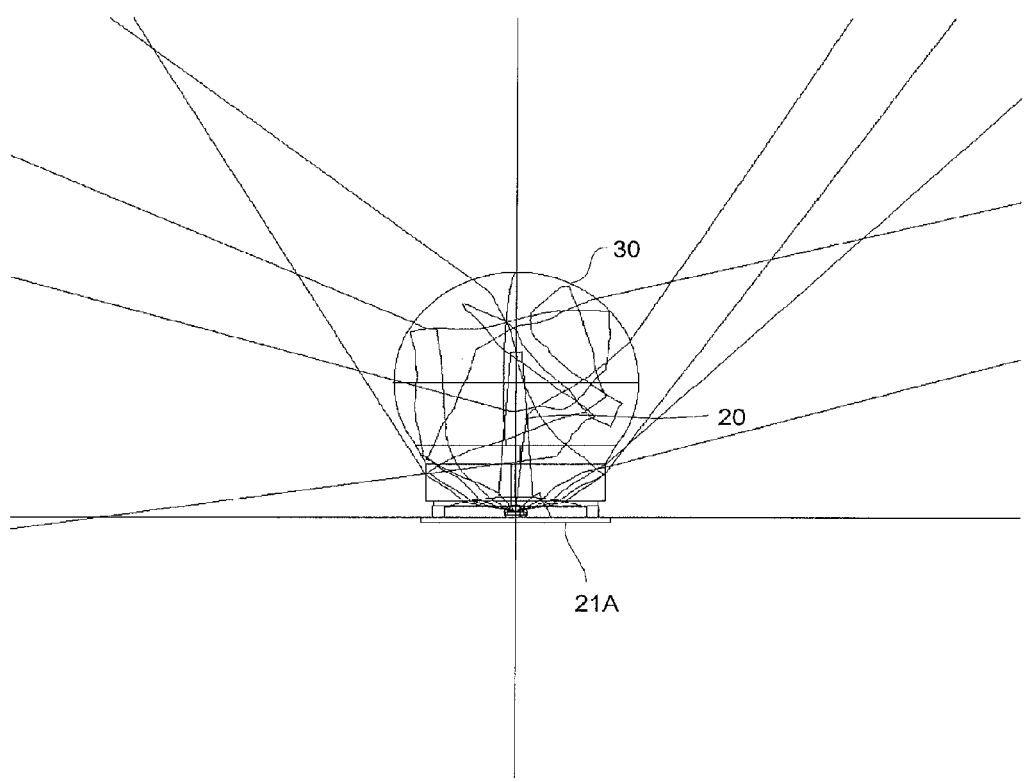

FIG. 14 shows traveling paths of rays of light emitted from the LED 11, in the light scattering/guiding globe 10; wherein the rays of light are those being at a large angle (40 to 90 degrees) in relation to an optical-axis normal line "K", among all rays of light emitted from the LED 11. At first, these rays of light enter the second light incoming surface 21B, and then travel in the light scattering/guiding globe 10 while being multiple-scattered. As described above, the LED 11 and the second light incoming surface 21B are set in such a way that the rays of light being at a large angle in relation to an optical-axis normal line "K" enter through the second light incoming surface 21B.

The rays of light being at a large angle (40 to 90 degrees) in relation to an optical-axis normal line "K" are refracted by the second light incoming surface 21B so as to enter the light scattering/guiding globe 10 at a less entrance angle in relation to an optical-axis normal line "K." As a result, an excessive output of light from around a root section of the radiation surface 30 of the light scattering/guiding globe 10 can be controlled so that rays of light are evenly radiated from all over the light scattering/guiding globe 10.

Thus, it is understood that, in the bulb-type LED lamp 1B, rays of light emitted from the LED 11 are output from the radiation surface 30 as outgoing rays of light in all directions by the light scattering/guiding globe 10 equipped with the light incoming surface 20B and the second light incoming surface 21B.

Figure 15:
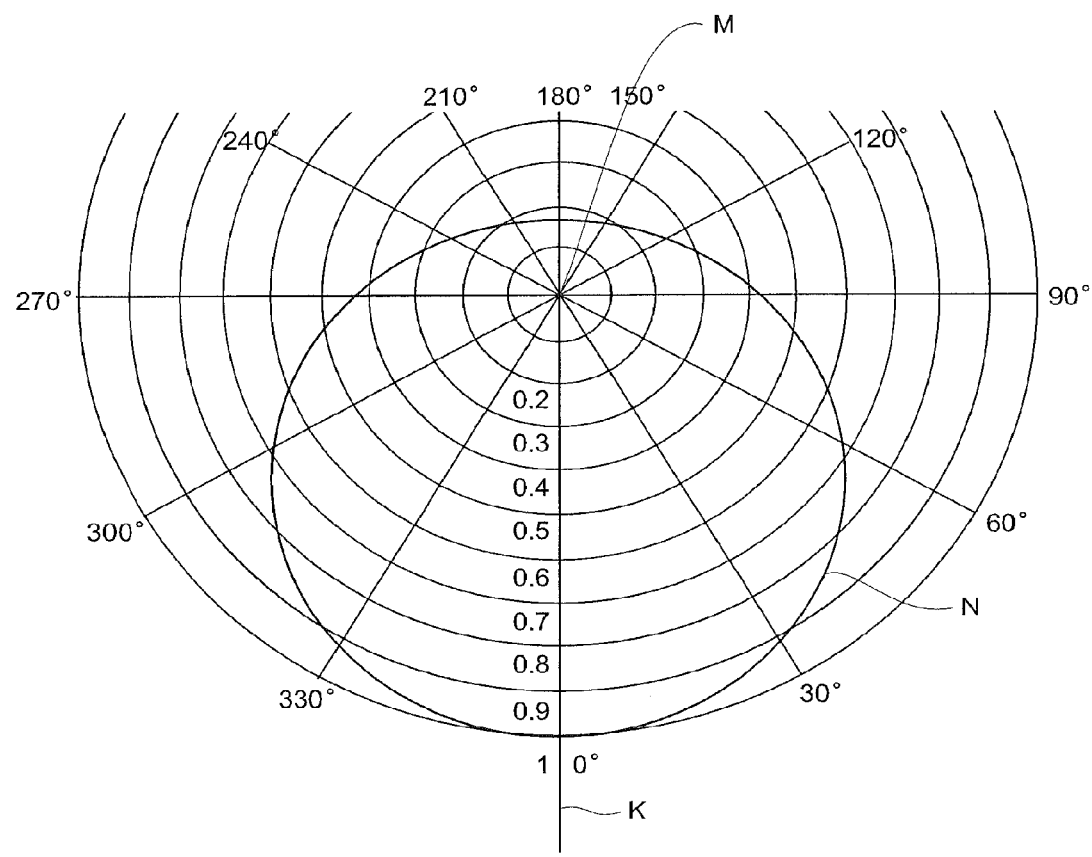
FIG. 15 shows a light intensity distribution of output light from a radiation surface of the bulb-type LED lamp shown in FIG. 12.

FIG. 15 shows a light intensity distribution of outgoing rays of light from the radiation surface 30 of the bulb-type LED lamp 1B. FIG. 15 is a drawing that corresponds to FIG. 4 and FIG. 9. A highest light intensity is observed within an orientation range of +/−45 degrees with respect to the optical-axis normal line "K" of the LED 11, and it is understood that there exists an almost constant output of light flux in a wide range.

Figure 16:
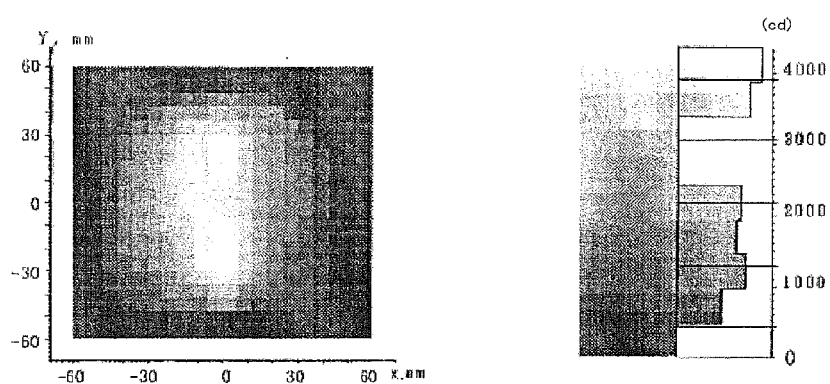
FIG. 16 shows a brightness of light emission from a side surface of the light scattering/guiding globe shown in FIG. 12.
Figure 17:
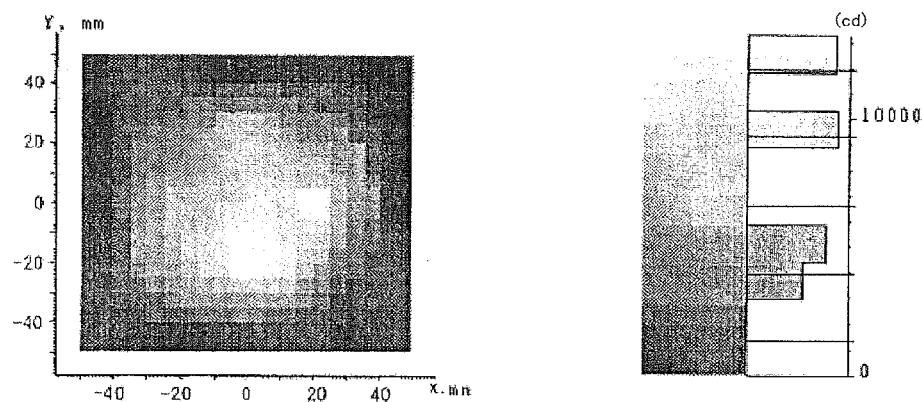
FIG. 17 shows a brightness of light emission from a top surface of the light scattering/guiding globe shown in FIG. 12.

FIG. 16 shows a brightness of light emission from a side surface of the light scattering/guiding globe 10. In the meantime, FIG. 17 shows a brightness of light emission from a top surface of the light scattering/guiding globe 10. For both FIG. 16 and FIG. 17, a brightness of the light scattering/guiding globe 10 is measured at a position 1 meter away from the light scattering/guiding globe 10. A right drawing of FIG. 16 represents the brightness distribution of a left drawing of FIG. 16 with numerical values. The right drawing of FIG. 16 shows the brightness distribution in candela (cd). In the meantime, a right drawing of FIG. 17 represents the brightness distribution of a left drawing of FIG. 17 with numerical values. The right drawing of FIG. 17 shows the brightness distribution in candela (cd).

According to FIG. 16 and FIG. 17, it is understood that light is output with almost even brightness from both the side surface and the top surface. A maximum brightness in the right drawing of FIG. 16 is located at around 4500 (cd), and a maximum brightness in the right drawing of FIG. 17 exceeds 10,000 (cd). Thus, it is understood that the brightness of the light scattering/guiding globe 10 is higher at the top surface than at the side surface.

(Regarding a Bulb-Type LED Lamp 1C According to a Fourth Embodiment of the Present Invention)

Figure 18:
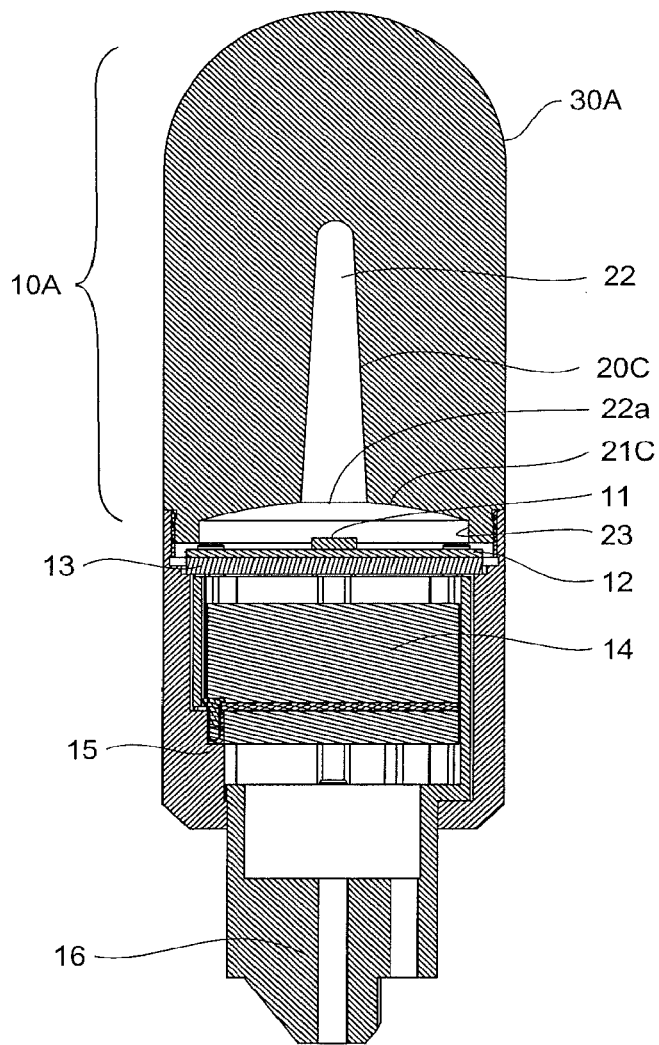
FIG. 18 is a general configuration drawing of a bulb-type LED lamp according to a fourth embodiment of the present invention.

Explained below is a bulb-type LED lamp 1C according to a fourth embodiment of the present invention. FIG. 18 is a configuration drawing of the bulb-type LED lamp 1C. The bulb-type LED lamp 1C is partially different from the bulb-type LED lamp 1A. In the following explanation; any member, which is identical or equivalent to that in the second embodiment, is explained by using the same or similar reference numeral, and then the explanation is omitted or simplified; and on the other hand any member, which is specific to the fourth embodiment, is mainly explained.

In the bulb-type LED lamp 1C, a second light incoming surface 21C is different from the second light incoming surface 21A of the bulb-type LED lamp 1A. Namely, between a bottom plane 22a of the first hollow section 22, being shaped conically, surrounded by the first light incoming surface 20C and the LED 11, the second light incoming surface 21C has a circular shape larger than the bottom plane 22a of the first hollow section 22. The second light incoming surface 21C has a concave shape in which, the further a position is located away from the LED 11 toward an outer circumference of the circular shape, the shorter a distance between the second light incoming surface 21C and the heat dissipating plate 13 at the position becomes.

Figure 19:
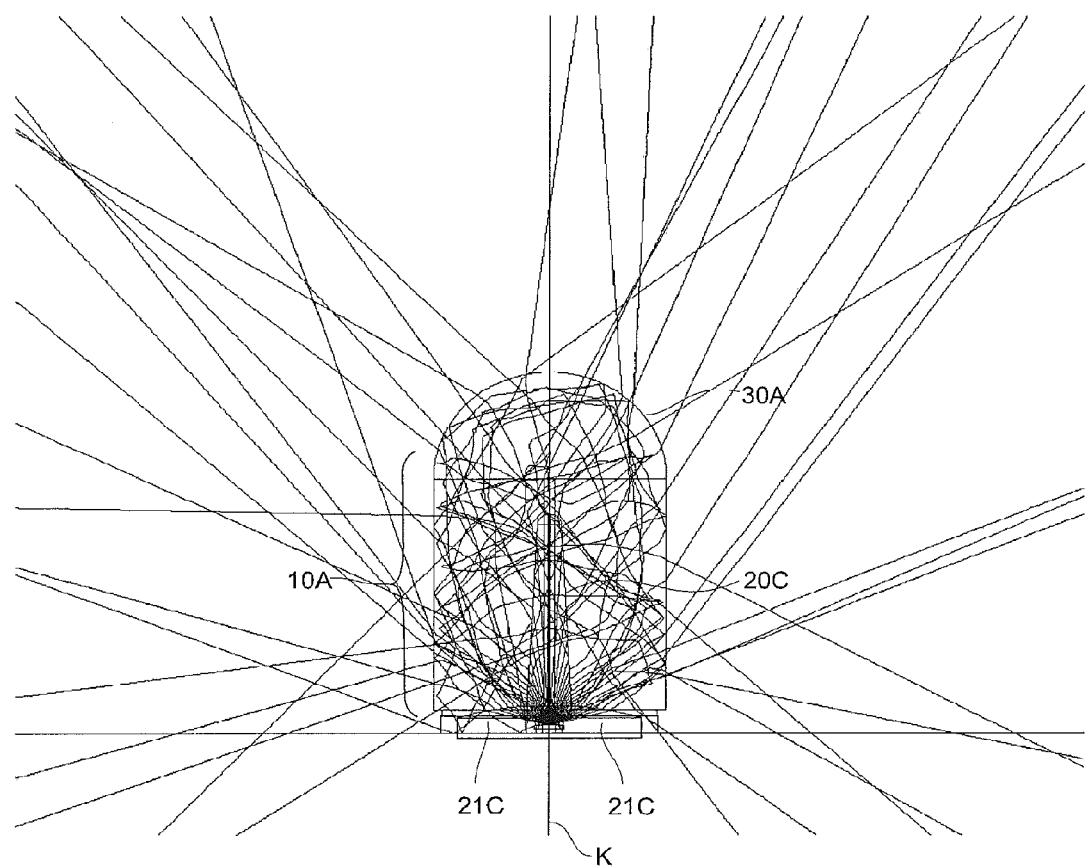
FIG. 19 shows traveling paths of rays of light emitted from an LED placed in a light scattering/guiding globe shown in FIG. 18.

FIG. 19 shows traveling paths of rays of light emitted from the LED 11. Rays of light, which come in through a first light incoming surface 20C and a second light incoming surface 21C, move forward while being multiple-scattered in the light scattering/guiding globe 10A. Then, they are output from a radiation surface 30A in a forward direction, a diagonally forward direction, a side direction, and a rearward direction. As shown in FIG. 19, it is understood that, in the bulb-type LED lamp 1C, rays of light emitted from the LED 11 are output in all directions.

Figure 20:
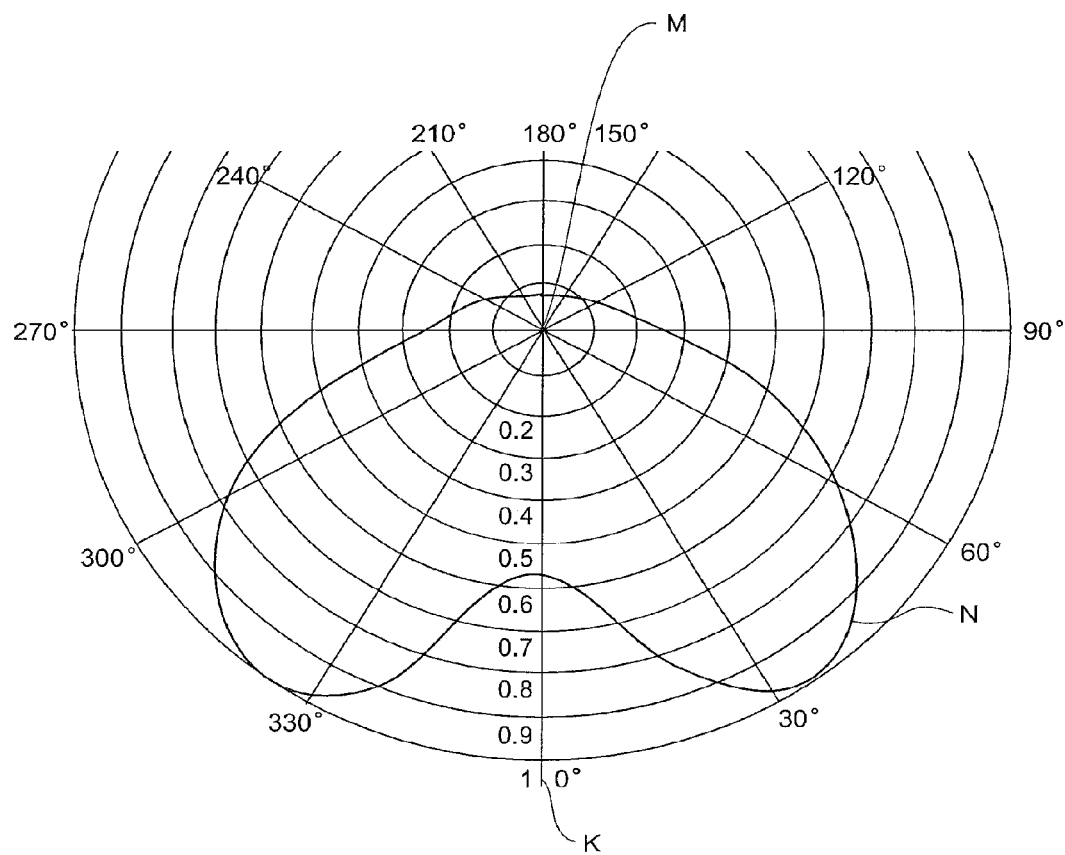
FIG. 20 shows a light intensity distribution of output light from a radiation surface of the bulb-type LED lamp shown in FIG. 18.

FIG. 20 shows a light intensity distribution of output light from the radiation surface 30A of the bulb-type LED lamp 1C. It is understood that there exists an almost constant output of light flux within a wide orientation range of 90 degrees in total on both sides of the optical-axis normal line "K" of the LED 11.

Figure 21:
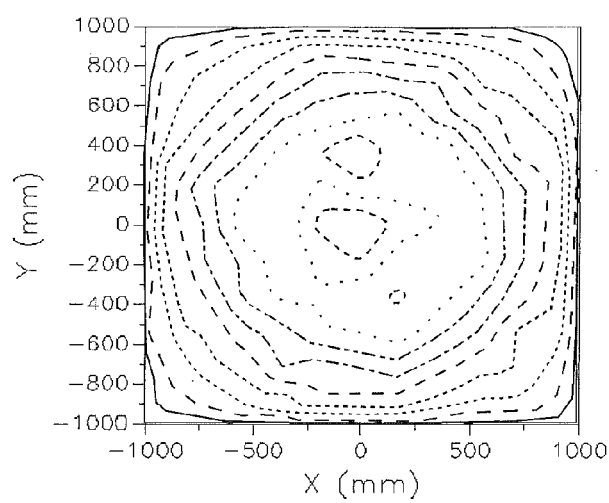
FIG. 21 shows a radiated light distribution at a position 1 meter ahead of the bulb-type LED lamp shown in FIG. 18.
Figure 22:
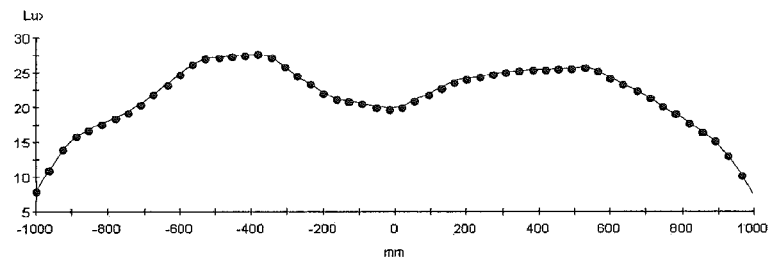
FIG. 22 shows a state of the radiated light distribution, shown in FIG. 21, in an area around a 0-mm position while a horizontal axis and a vertical axis representing a distance and a luminous intensity, respectively.

FIG. 21 shows a radiated light distribution at a position 1 meter ahead of a top (a part shaped like a lens) of the bulb-type LED lamp 1C, wherein a view field stretches for 1 meter each upward, downward, rightward, and leftward with its center at the position mentioned above. Meanwhile, FIG. 22 shows a state of the radiated light distribution, shown in FIG. 21, in an area around a 0-mm position while a horizontal axis and a vertical axis representing a distance and a luminous intensity (Unit: Lux), respectively. It is understood that, according to the bulb-type LED lamp 1C, light is radiated evenly over a wide range as shown in FIG. 21 and FIG. 22. In the meantime, a luminous intensity is somewhat reduced at a central area in FIG. 21 and FIG. 22. The central area corresponds to the luminous intensity at the top (a part shaped like a lens) of the bulb-type LED lamp 1C, and output light from a side surface and the like of the bulb-type LED lamp 1C is gathered at the area by a reflector and so on so that no unfavorable condition actually occurs. Incidentally, such a phenomenon is remedied in the case of the bulb-type LED lamp 1A.

(Other Modifications)

Figure 23:
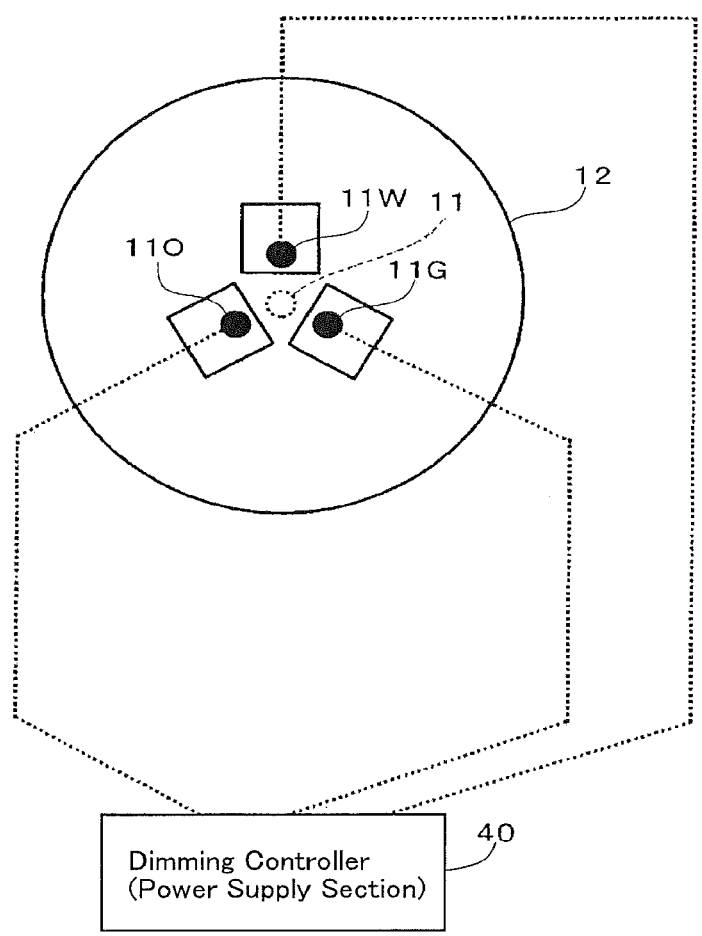
FIG. 23 shows a layout state of 3 LEDs and a dimming controller according to another embodiment.

Various other modifications may be made on the embodiments of the present invention without departing from the concept of the present invention. In the above embodiments, the LED 11 is described as a white LED. Alternatively, any LED in other colors may be used. Moreover, in the above embodiments, one and only LED is used as the LED 11. Alternatively, any other structure including a plurality of LEDs 11 may be applied. Such a structure is explained with reference to FIG. 23. Shown in FIG. 23 are a circuit board 12, three LEDs 11W, 11G, and 11O placed on the circuit board 12, and a dimming controller 40. The LEDs 11W, 11G, and 11O are a white LED, a green LED, and an orange-colored LED, respectively. The three LEDs 11W, 11G, and 11O are placed at positions in the vicinity of the installation position of the LED 11 in the embodiments described above (indicated with a dashed line in the drawing). On this occasion, while the LEDs 11W and 11G being super luminosity LEDs, the LED 11O may be a type of LED less-luminous in comparison with the other LEDs 11W and 11G.

The dimming controller 40 corresponds to the power supply section 14 and the like, and it can supply the three LEDs 11W, 11G, and 11O individually with electric power. On this occasion, the dimming controller 40 controls either current values or light emission pulse duty ratios for the three LEDs 11W, 11G, and 11O so that light emission intensity of the three LEDs 11W, 11G, and 11O can individually be controlled.

Thus, rays of light emitted from the three LEDs 11W, 11G, and 11O enter the light scattering/guiding globes 10 and 10A through the first light incoming surfaces 20, 20A, 20B, and 20C as well as the second light incoming surfaces 21, 21A, 21B, and 21C of the light scattering/guiding globes 10 and 10A. Then, the rays of light are multiple-scattered and their colors are mixed within the light scattering/guiding globes 10 and 10A, and subsequently the light is output from the radiation surfaces 30 and 30A.

Thus, while a color temperature of the bulb-type LED lamps 1, 1A, 1B, and 1C being changed successively in a range of 2000K to 7000K, homogeneous light can be output from the radiation surfaces 30 and 30A.

Still as another modification, 3 LEDs having their light colors corresponding to the three primary colors (Red, Blue, and Green) may be prepared to materialize a bulb-type LED lamp that emits light in various colors according to requests of users by controlling their light emission intensities.

According to the bulb-type LED lamps 1, 1A, 1B, and 1C, light can be output with uniform brightness from an entire area of the light scattering/guiding globes 10 and 10A without lowering an efficiency of light output. Thus, it becomes possible to reduce the chance of causing a glare or a discomfort feeling on humans.

Furthermore, according to the bulb-type LED lamps 1, 1A, 1B, and 1C, even with the small number of LEDs to be used (for example, even one LED), light can be output with uniform brightness from an entire area of the light scattering/guiding globes 10 and 10A. Thus, it becomes possible to implement a reduction in power consumption of the bulb-type LED lamps 1, 1A, 1B, and 1C.

Moreover, according to the bulb-type LED lamps 1A and 1C, light can uniformly be radiated onto an objective irradiation area with high efficiency by suitably controlling the characteristics of output light distribution of the light scattering/guiding globe 10A alone.

According to the modification of the embodiment shown in FIG. 23, provided can be a lighting apparatus that is able to change a color temperature of its bulb-type LED lamp in a uniform soft light range from a warm color to a white color by means of changing the light quantity of the LED 11O, changing the light quantity of the LED 11W while keeping the LED 11O unchanged, or changing the light quantities of both the LEDs, wherein one and only bulb-type LED lamp being used.

What is claimed is:

1. A light emitting device comprising:
  a globe; and
  an LED which is disposed on one end of the globe;
  in which:
  the globe is a solid component made of a light scattering/guiding member containing light scattering particles, and
  the globe has a bottom plane facing the LED, and is provided with a first hollow section, which is formed in a conical shape in the light outputting direction from the bottom plane by hollowing out a central inside surface of the globe and which changes directions of incoming rays of light from the LED to the globe by refraction and/or reflection.

2. The light emitting device according to claim 1, further comprising a second hollow section shaped around the first hollow section, in which the second hollow section has a concave shape in which a position located further away from the LED toward an outer circumference side has a deeper depth.

3. The light emitting device according to claim 1, further comprising a second hollow section between the bottom plane of the conical shape of the first hollow section and the LED, in which the second hollow section has a circular shape larger than the bottom plane, and has a concave shape in which a position located further away from the LED toward an outer circumference of the circular shape has a shallower depth.

4. The light emitting device according to claim 1, in which the globe is at least partially shaped like a ball.

5. The light emitting device according to claim 1, in which the globe is at least partially shaped like a circular cylinder, and one end of the circular cylinder opposite from the LED is shaped like a convex lens.

6. The light emitting device according to claim 1, comprising a plurality of LEDs, the emission colors of which are different from each other, disposed on the one end of the globe; and a dimming controller for controlling light emission intensity individually of the plurality of LEDs.

7. A bulb-type LED lamp comprising the light emitting device according to claim 1.

8. The light emitting device according to claim 4, comprising a plurality of LEDs, the emission colors of which are different from each other, disposed on the one end of the globe; and a dimming controller for controlling light emission intensity individually of the plurality of LEDs.

9. The light emitting device according to claim 5, comprising a plurality of LEDs, the emission colors of which are different from each other, disposed on the one end of the globe; and a dimming controller for controlling light emission intensity individually of the plurality of LEDs.

* * * * *